United States Patent [19]

Friess et al.

[11] Patent Number: 4,928,818
[45] Date of Patent: May 29, 1990

[54] CONTAINER FOR COMPACT DISKS

[76] Inventors: Alan Friess, 3604 Hillview Crescent, Edmonton, Alberta, Canada, T6L 1C4; Colin Friess, 1432 - 63 Street, Edmonton, Alberta, Canada, T6L 1X7

[21] Appl. No.: 399,027
[22] Filed: Aug. 28, 1989
[51] Int. Cl.⁵ .......................................... B65D 65/672
[52] U.S. Cl. .................... 206/309; 206/387; 220/21; 211/40
[58] Field of Search ................. 206/309, 387; 220/21; 211/40

[56] References Cited

U.S. PATENT DOCUMENTS

| | | | |
|---|---|---|---|
| 4,235,490 | 2/1980 | Schwartz et al. | 206/387 |
| 4,432,453 | 2/1984 | Berkman | 206/387 |
| 4,511,194 | 4/1985 | Park et al. | |
| 4,577,914 | 3/1986 | Stravitz | 206/309 |
| 4,655,345 | 4/1987 | Drake et al. | |
| 4,741,438 | 5/1988 | Mastronardo et al. | |
| 4,747,484 | 5/1988 | Ackeret | |
| 4,762,225 | 8/1988 | Henkel | |
| 4,781,292 | 11/1988 | Sacherman et al. | 206/309 |
| 4,790,926 | 12/1988 | Mastronardo et al. | 206/309 |
| 4,807,749 | 2/1989 | Ackeret | |

Primary Examiner—Joseph Man-Fu Moy
Attorney, Agent, or Firm—Adrian D. Battison; Stanley G. Ade; Murray E. Thrift

[57] ABSTRACT

A container for compact disks comprises a structure which is generally square in plan of twelve inch side length with a thickness substantially less than the dimension of the side and generally either 0.5 inches or 1.0 inches so that the container can be stored along side like containers or along side conventional twelve records in a furniture unit designed to receive conventional twelve inch records. The container receives the compacts disks in two channels defined along one side of the a flat plate defined in the container. Thus four compact disks can be received on one side of the plate with two in each of two channels with the channels being open along one side of the plate and closed at the other end by a flat surface projecting outwardly from the plate.

19 Claims, 3 Drawing Sheets

CONTAINER FOR COMPACT DISKS

BACKGROUND OF THE INVENTION

This invention relates to a container for storing compact disks.

Compacts disks have become very popular in recent years in view of the high quality sound reproduction and their resistance to damage and other mistreatment. Sound recordings therefore are now available on three difference mediums, that is the somewhat oldfashioned conventional twelve inch disk, the tape cassette and the compact disk or laser disk. Storage of these different types of record of course requires entirely different storage equipment.

Conventionally, twelve inch records have been stored side by side in vertical arrangement generally in furniture which is shaped to receive the twelve inch record. Various holders are available for cassette tapes or they can simply be stacked on top of another.

Attention has been given to the storage of compact disks and various different designs of equipment and furniture have been developed for storing such disks. Examples are shown in U.S. Pat. Nos. 4,741,438 and 4,790,926 (Mastronardo), 4,655,345 (Drake), 4,762,225 (Henkel), 4,807,749 and 4,747,484 (Ackerat).

In all these devices the disks are stored side by side generally inserted into slots defined in a rectangular housing resulting in a unit which is approximately five inches by five inches with a length or height which is dependent upon the number of disks stored. Henkel discloses a foldable system which defines a number of pockets of very limited storage capacity. However storage in a device -of this type provides a resultant unit which is not very convenient and must merely rest upon suitable surface of the furniture.

Much furniture designed in the past and still used by record collectors is dimensioned to receive twelve inch records and has a number of shelves and compartments for receiving such twelve inch records. However these shelves are not suitable for receiving the container described above since much space is wasted and the resultant appearance is makeshift and unattractive.

SUMMARY OF THE INVENTION

It is one object of the present invention, therefore, to provide a container for compact disks which improves the storage of compact disks.

It is a further object of the present invention to provide a storage unit for compact disks which enables them to be stored conveniently with existing twelve inch records.

It is a yet further object of the present invention to provide a storage device for compact disks which enable the disks to be readily accessible and available for inspection of the disks stored in a comprehensive library of the disks.

According to the invention, therefore, there is provided a container for storing compact disks comprising a planar support member which is square in plan defining four sides each substantially equal to twelve inches in length, and receiving means mounted on at least one side of the support member for receiving a plurality of said compact disks, said receiving means being shaped to receive said compact disks mounted parallel to the support member and so as to confine said compact disks so as to lie spaced apart on and within the square face of the support member, said container being self-supporting and thin so as to simulate the size of a conventional twelve inch record.

The unit in which the compact disks are stored is therefore a substantially flat element which is shaped to simulate a twelve inch record so that the flat element containing four or eight of the compact disks can be inserted with conventional records or in place of conventional records in an existing furniture unit.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

BRIEF DESCRIPTION OF THE DRAWINGS

In the drawings like characters of reference indicate corresponding parts in the different figures.

DETAILED DESCRIPTION

Figure 1:
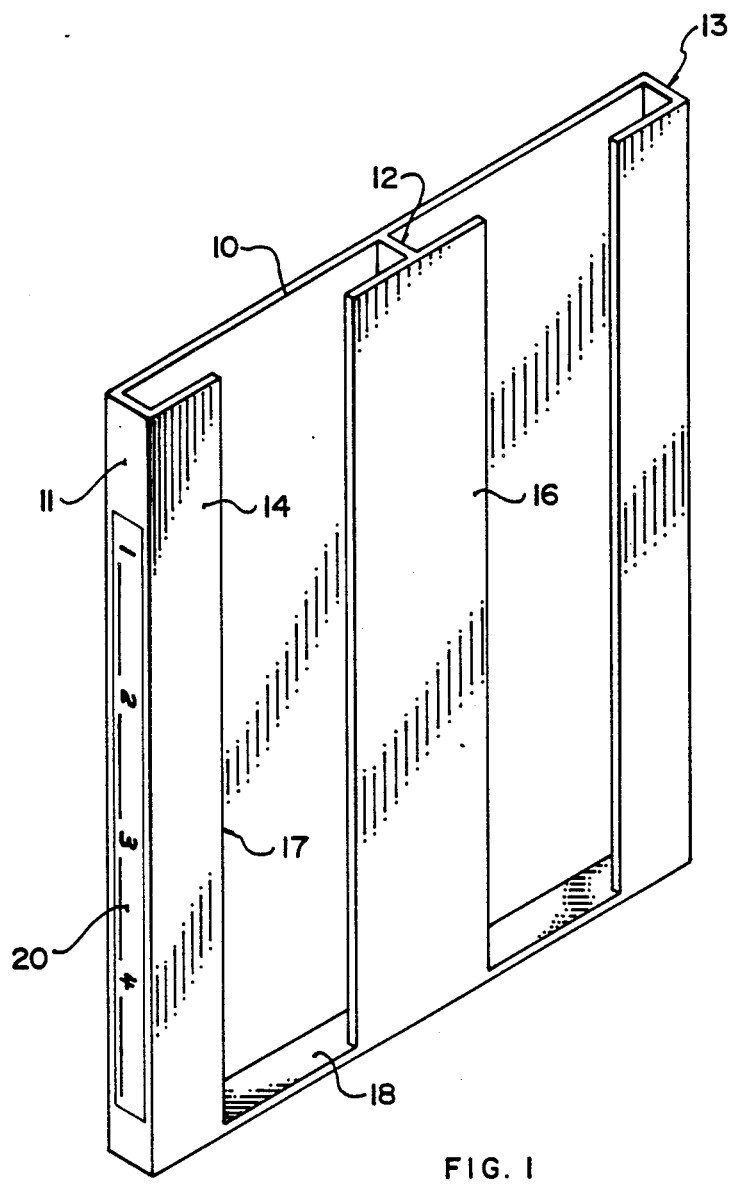
FIG. 1 is an isometric view of the first embodiment of the invention.

The storage device of FIG. 1 comprises a support plate 10 in the form of a square flat plate formed of a thin plastics material which is preferably transparent and of sufficient rigidity to hold the unit and particularly the support member flat and self supporting. Three side walls 11, 12 and 13 are provided with the first indicated at 11 arranged along one side of the square support member 10 and the third side wall 13 arranged along the opposed side of the support member 10. The second of the side walls is arranged directly along the centre line of the support member. Each of the side walls is parallel to the others and all extend at right angles to the support member 10.

The height of each of the side walls is arranged in the order of 0.5 inches. The outer edge or each of the side walls is formed a flange member which extends parallel to the support member 10. The side wall 11 thus has a flange member 14 extending inwardly across the upper surface member 10. The side wall 13 similarly has a flange member 15 which projects inwardly towards the flange member 14. In between the flange members 14 and 15 is provided flange member 16 of double width relative to the flange members 14 and 15 and which bridges the outer edge of the side wall 12 with portions extending in either direction. It is appreciated therefore that the flange members 14 and 16 define with the side walls 11 and 12 a slot shaped channel with a central opening 17.

With the sides of the support member 10 being of the order of twelve inches, the length of the slot shaped opening of the channel is of the order of six inches with a width slightly less than 0.5 inches which is sufficient to receive a packaged compact disk which can slide along the channel. The lower end of the channel opposite the-open end at the upper side of the support member 10 is closed by a flat end face 18 which is connected to the support member 10 and extends outwardly therefrom a right angles and is also connected to the side walls 11, 12 and 13 together with the flange members 14, 16 and 15.

The unit thus provides or forms an integral member which has a front face and a rear face both of which are square in plan view and have sides substantially equal to twelve inches in length. The thickness of the containers of the order of 0.5 inches so that it simulates the size of a conventional twelve inch record which is as is well known is generally stored in a square cardboard container with a thickness of the order of one-quarter inch.

Each channel defined on one side of the support member 10 can receive two compact disks which slide downward into the channel and sit one on top of the other confined in the channel.

One outer face of the a side wall, in this case the side wall 11 carries a label 20 which has spaces defined on the label for receiving written indicia cataloguing the four compact disks stored on the container.

Figure 2:
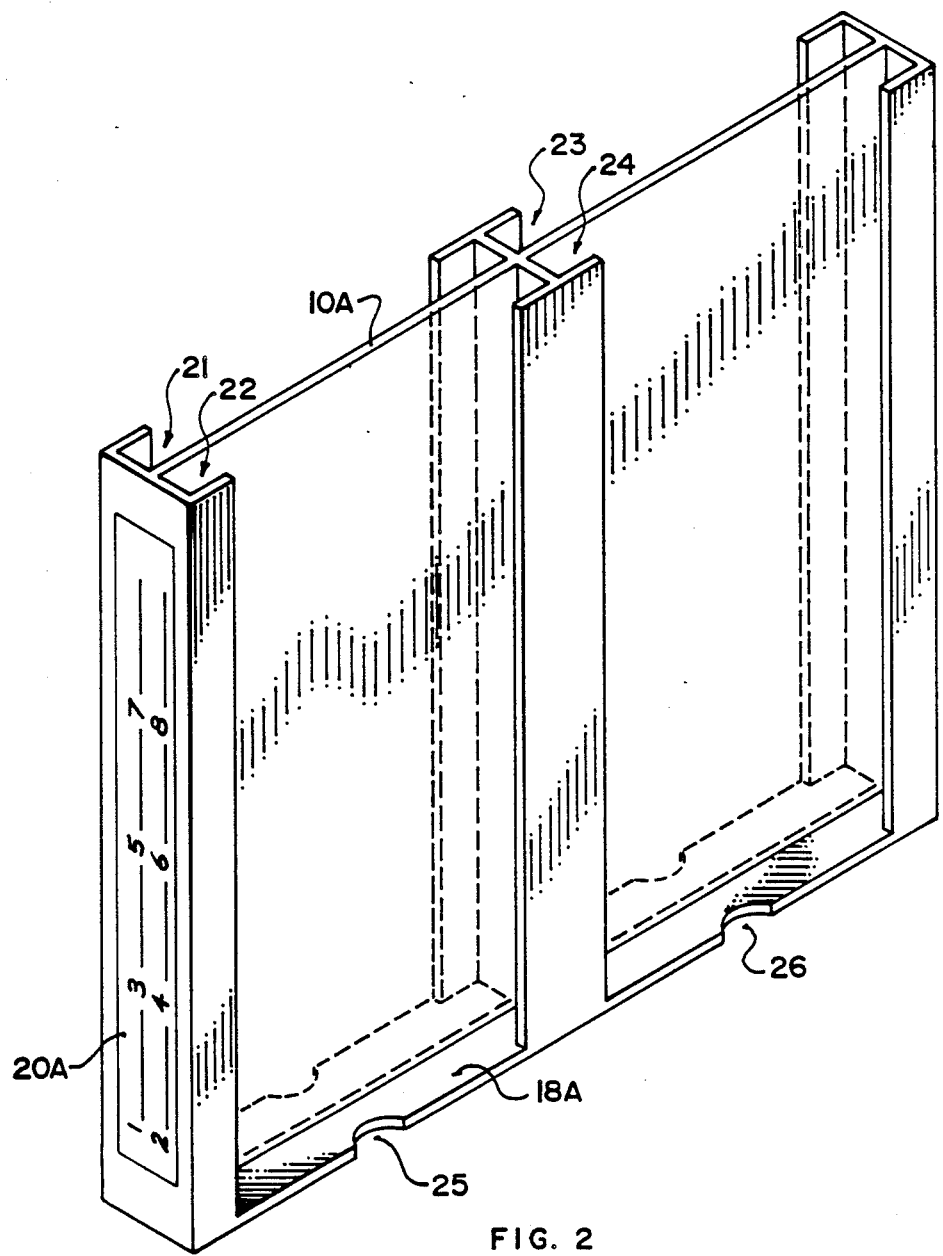
FIG. 2 is an isometric view of a second embodiment to the invention.
Figures 3, 4:
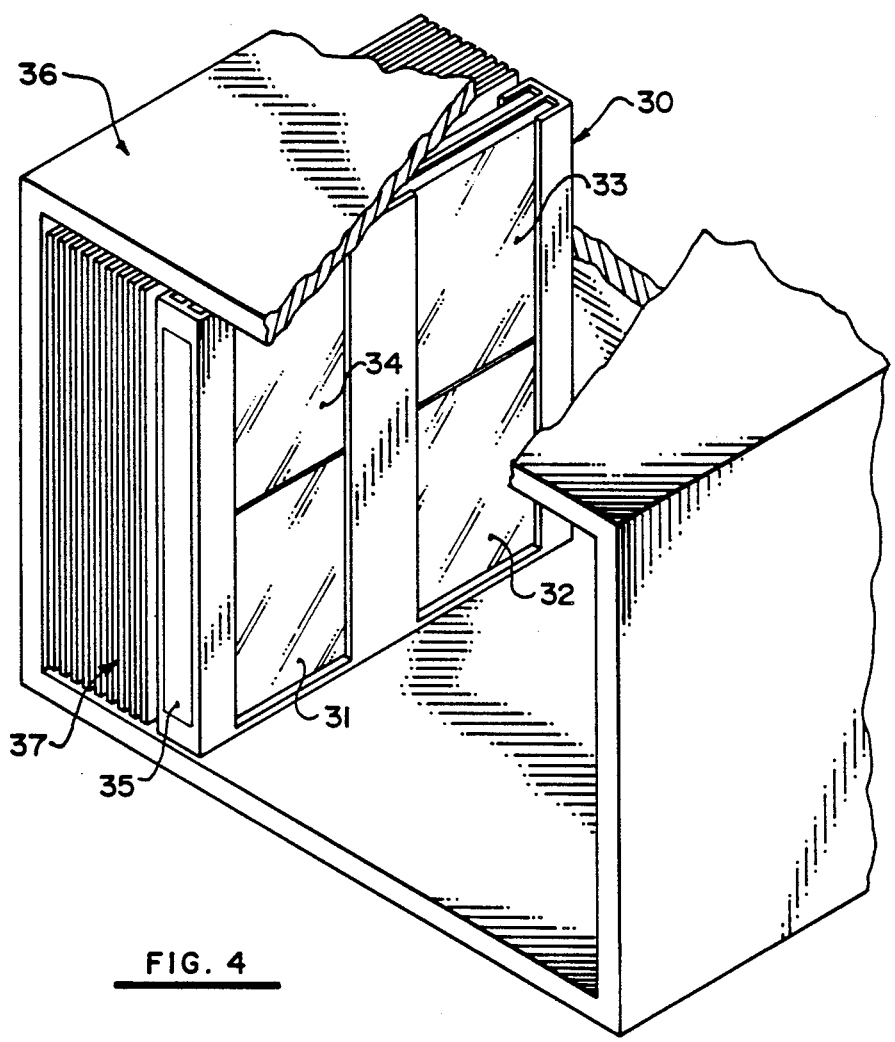
FIG. 3 is top plan view of the embodiment of FIG. 2.
FIG. 4 is an isometric view of the embodiment of FIG. 2 in use for storing compact disks.

Turning now to FIGS. 2 and 3, it will be appreciated that the embodiment shown in these figures is substantially the same as that shown in FIG. 1 except that it has channels formed on both sides of the support member 10A. Thus in this case there are defined four channels 21, 22, 23 and 24 each of which can receive two compact disks as previously described. The label indicated at 20A is of course modified to receive sufficient spaces for the indicia relating to eight compact disks so that each can be catalogued on the end face. In this case the end face 18A has a pair of recessed cut outs 25 and 26 each cooperating with a respective one of the channels. The recess acts a finger recess so that the user can insert his finger into the recess and lift lowermost one of the stored compact disks out of the respective channel.

A the container shown in FIGS. 2 and 3 is sized to receive eight compact disks, its width is of the order of one inch that is double the width of the container shown in FIG. 1. The structure is again substantially rigid so that it can be grasped at one edge and inserted into a vertical position along side like containers or along side conventional twelve inch disks.

In FIG. 4 shown schematically one of the containers indicated at 30 including compact disks 31, 32, 33 and 34 with a label 35 on the outermost faces of the container. The container is stored in a furniture structure 36 along side a plurality of conventional twelve inch records indicated at 37. It will be appreciated that further conventional records can be inserted into the furniture structure 30. Alternatively, the furniture structure can contain solely containers of the type shown in FIGS. 1 or 2.

The containers of the present invention thus enable compact disks to be stored in an effectively catalogued manner in conventional furniture dimensioned to receive the conventional twelve inch disk.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A container for storing compact disks comprising a planar support member which is square in plan defining four sides each substantially equal to twelve inches in length, and receiving means mounted on at least one side of the support member for receiving a plurality of said compact disks, said receiving means being shaped to receive said compact disks mounted parallel to the support member and so as to confine said compact disks to lie spaced apart on and within the square face of the support member, said container being self-supporting and thin so as to simulate the size of a conventional twelve inch record.

2. The invention according to claim 1 wherein the receiving means comprises means defining a pair of parallel channels on said one surface, said channels having one open end at one side of said support member and being shaped to receive a compact disk slideable therealong from said one open end into the channel.

3. The invention according to claim 2 wherein each of the channels has a length sufficient to receive two compact disks in end to end relationship.

4. The invention according to claim 2 wherein each of the channels is defined by a pair of side walls arranged in parallel spaced relation with each side wall projecting outwardly from the support member at right angles thereto and a pair of flanges each lying parallel to support member at a position spaced therefrom and carried by outer edges of the side walls.

5. The invention according to claim 2 wherein each of the channels includes an end face closing an end of the channel opposite to said open end.

6. The invention according to claim 5 wherein each of the end faces includes a recess in one edge thereof.

7. The invention according to claim 1 wherein each side of said support member includes receiving means thereon.

8. The invention according to claim 1 wherein said receiving means defines an end face of the support member at right angles to the support member and lying in a plane of one edge of the support member, the end face having mounted thereon a label for receiving written information identifying the compact disks stored in the container.

9. The invention according to claim 1 wherein the thickness of the container is less than one inch.

10. A container for compact disks comprising a container body having a plurality of receptacles for receiving said compact disks, said body having a front and a rear face the outer periphery of which in plan are square with sides substantially equal to twelve inches and four edge surfaces each of which has a width less than the order of one inch, the container being self supporting so that it can be lifted at one edge and inserted into a stack of like containers.

11. The invention according to claim 10 wherein the receptacles comprise means defining a pair of parallel channels on said one surface, said channels having one open end at one side of said container body and being shaped to receive a compact disk slideable therealong from said one open end into the channel.

12. The invention according to claim 11 wherein each of the channels has a length sufficient to receive two compact disks in end to end relationship.

13. The invention according to claim 11 wherein each of the channels is defined by a pair of side walls arranged in parallel spaced relation with each side wall projecting from the container body at right angles thereto and a pair of flanges each lying parallel to support member at a position spaced therefrom and carried by outer edges of the side walls.

14. The invention according to claim 11 wherein each of the channels includes an end face closing an end of the channel opposite to said open end.

15. The invention according to claim 14 wherein each of the end faces includes a recess in one edge thereof.

16. The invention according to claim 11 wherein each side of said container body includes receptacles thereon.

17. The invention according to claim 1 wherein one edge surface of the container body has mounted thereon a label for receiving written information identifying the compact disks stored in the container body.

18. The invention according to claim 1 wherein the thickness of the container body is less than 0.5 inches.

19. A container for storing compact disks comprising a planar support member which is square in plan defining four sides each substantially equal to twelve inches in length, a first, a second and a third side wall extending in parallel spaced relation across the support member and at right angles to the support member, the first and third side walls being arranged at opposed sides of the support member and the second side wall being arranged half way across the support member, and flange means mounted at the edge of the side walls remote from the support member and projecting parallel to the support member so that the flange means, side walls, and support member define two parallel channels having one end of each channel open at a side of the support member, an end face member closing an opposed end of each of the channels, each of the side walls having a width of the order of one-half inch, the container being substantially self-supporting so as to simulate the size and structure of a convention twelve inch record and such that the container can be inserted into a stack including twelve inch records and like containers.

* * * * *